United States Patent [19]
Sakamoto et al.

[11] 3,846,707
[45] Nov. 5, 1974

[54] CHANNEL SELECTION DEVICE

[75] Inventors: Yoichi Sakamoto; Yukio Koyanagi, both of Osaka, Japan

[73] Assignee: Matsushita Electric Co., Ltd., Kadoma-shi, Osaka-fu, Japan

[22] Filed: Nov. 1, 1971

[21] Appl. No.: 194,421

[30] Foreign Application Priority Data

| | | |
|---|---|---|
| Nov. 4, 1970 | Japan | 45-97388 |
| Nov. 4, 1970 | Japan | 45-97389 |
| Nov. 4, 1970 | Japan | 45-97390 |
| Nov. 4, 1970 | Japan | 45-97391 |
| Nov. 4, 1970 | Japan | 45-97392 |
| Nov. 4, 1970 | Japan | 45-97393 |
| Nov. 4, 1970 | Japan | 45-97394 |
| Nov. 4, 1970 | Japan | 45-97395 |
| Nov. 4, 1970 | Japan | 45-97396 |
| Nov. 4, 1970 | Japan | 45-97397 |
| Nov. 4, 1970 | Japan | 45-97398 |
| Nov. 4, 1970 | Japan | 45-97399 |
| Nov. 4, 1970 | Japan | 45-97400 |
| Nov. 4, 1970 | Japan | 45-97401 |
| Nov. 4, 1970 | Japan | 45-97402 |

[52] U.S. Cl. .................. 325/334, 325/453, 325/470, 334/15

[51] Int. Cl. .............................................. H04b 1/32

[58] Field of Search ........... 325/468, 469, 470, 464, 325/465, 453, 332, 333, 334, 418, 419, 420, 421, 422, 423, 458, 459; 334/14, 15, 18, 16, 20, 26; 333/17; 331/2, 4, 37, 46, 48, 49, 55

[56] References Cited

UNITED STATES PATENTS

| | | | |
|---|---|---|---|
| 2,954,465 | 9/1960 | White | 325/334 X |
| 3,602,822 | 8/1971 | Evans et al. | 325/364 |
| 3,611,152 | 10/1971 | Sakai et al. | 325/469 |
| 3,619,788 | 11/1971 | Giles, Jr. et al. | 325/465 |
| 3,641,434 | 2/1972 | Yates et al. | 325/421 X |
| 3,651,411 | 3/1972 | Zlotnick | 325/470 |

*Primary Examiner*—Benedict V. Safourek

[57] ABSTRACT

A reference signal frequency is generated for selection of a desired channel by a frequency sweep circuit comprising two sweep oscillators. The operations of the oscillators are reversed with each other at a predetermined frequency interval, and a voltage sweep main circuit and a voltage sweep sub-circuit are provided to apply a control voltage to a variable capacitance diode. The diode is contained in a tuner to control the sweep operation by the voltage sweep circuits in response to the reference frequency for channel selection.

13 Claims, 11 Drawing Figures

CHANNEL SELECTION DEVICE

BACKGROUND OF THE INVENTION

The present invention relates to a channel selection device for television receivers and, more particularly to an automatic electronic channel selection device for television receivers.

A variable capacity diode is used for channel selection in a local oscillator in the tuner of a television receiver. To apply a tuning voltage to the variable capacity diode, one method employs a plurality of variable resistors and push buttons while another employs automatic tuning involving a voltage sweep circuit to apply a voltage to the diode which produces a desired intermediate frequency to stop the sweep. In the former method, variable resistors equal in number to the channels to be received are required, so that the channel selection device inevitably becomes large in size. Furthermore, it is very inconvenient to preset these variable resistors for respective channels during installation or when it is required. The latter method has as a disadvantage that it is impossible to provide a digital indication, and that the automatic channel selection device stops its function by the aural carrier. Additionally, the automatic selection is so unstable in operation as to shift to a non-selected channel due to interruption and fluctuation in strength of the received radio wave.

SUMMARY OF THE INVENTION

One of the objects of the present invention is therefore to provide an improved channel selection device which may overcome the defects of the prior art channel selection devices.

Another object of the present invention is to provide a channel selection device which is capable of channel selection without presetting and of digital indication of a selected channel number.

Another object of the present invention is to provide a channel selection device which is so reliable and stable in operation that the erratic operation of the aural carrier and the shift of the channel selection device to a channel other than a desired channel due to interruption and fluctuation in strength of the received signals may be positively prevented.

According to one aspect of the present invention, a reference signal frequency corresponding to a desired channel is generated by a frequency sweep circuit comprising two sweep oscillators whose functions are reversed with each other at a predetermined frequency interval. There are provided a voltage sweep main circuit and a voltage sweep sub-circuit to apply a control voltage to a variable capacitance diode in a tuner of a television receiver. The functions of the voltage sweep circuits are controlled by said reference signal frequency for channel selection.

According to one embodiment of the present invention, the need for presetting the voltage to be applied to the variable capacitance diode by the variable resistors is eliminated. In the prior channel selection devices, the preset variable resistors must be adjusted for selection of respective channels to be received by a television receiver, but according to the present invention, any desired channel may be selected without adjustment. Furthermore, the number of channels to be selected is not limited by the number of preset variable resistors, so that, for example, 62 channels may be received in Japan.

In the prior automatic tuning device, in which the voltage sweep circuit sweep is stopped, it is extremely difficult to display digitally a selected channel. However, according to the present invention, the digital display of a selected channel becomes possible. In the prior automatic tuning device, the sweep is stopped by the aural carrier or color subcarrier, so that means must be provided to eliminate these carriers. However, the present invention eliminates this need by the provision of a voltage sweep main circuit and a voltage sweep sub-circuit. Furthermore the problem of the prior art automatic tuning device relating to shifting from the selected to other channels due to the varying strength of the received signals is also overcome by the provision of the voltage sweep main circuit and the sweep sub-circuit. Moreover, the unstable operation of the prior automatic tuning device in the area of the weak field intensity may be also eliminated.

The curve representing the relation between the received frequency and the voltage applied to the variable capacitance diode in a tuner varies slightly for each tuner, so that the characteristics of the channel indicator and the above curve must be matched to each other in the prior channel selection device utilizing the preset variable resistors. However, in the technical state of the prior art complete matching cannot be attained. However, in the channel selection device constructed in accordance with the concept of the present invention, the channel selection and indication can be accomplished based on the reference frequencies assigned to the respective channel bands independently of the characteristics of the tuner so that the problem in the prior art may be overcome.

In the prior automatic tuning device using the voltage sweep, the sweep is stopped by the image frequency for UHF band reception, so that the image ratio of the tuner must be improved. However, this problem is also overcome by the present invention which provides the main sweep circuit, and sub--sweep circuit, and a reference frequency generator circuit which generates the reference signal in response to a signal representative of the difference in frequency of 6 MHz.

DESCRIPTION OF THE PREFERRED EMBODIMENT

Figure 1A:
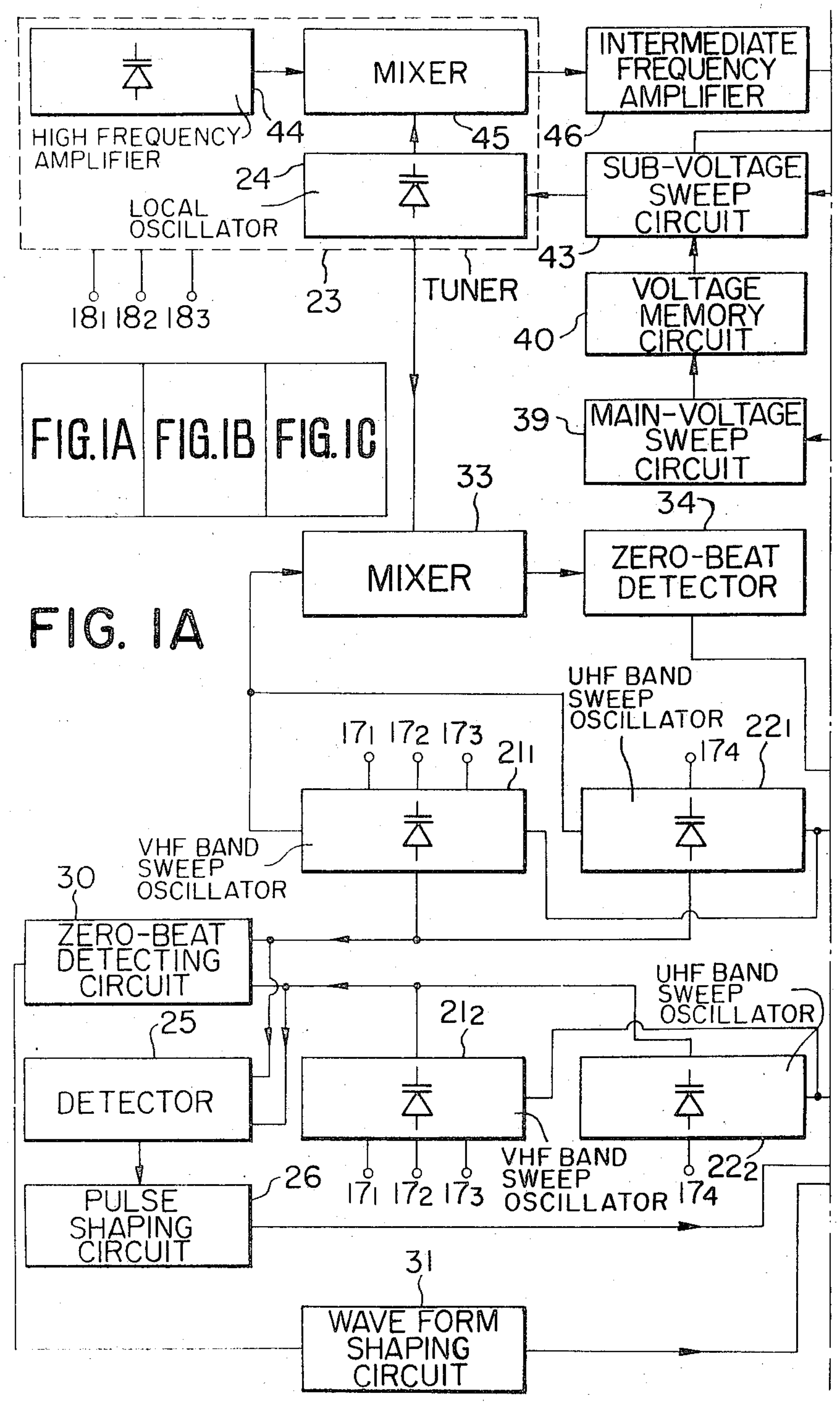
FIGS. 1A, 1B and 1C are block diagrams of a channel selection device in accordance with the present invention.
Figure 1B:
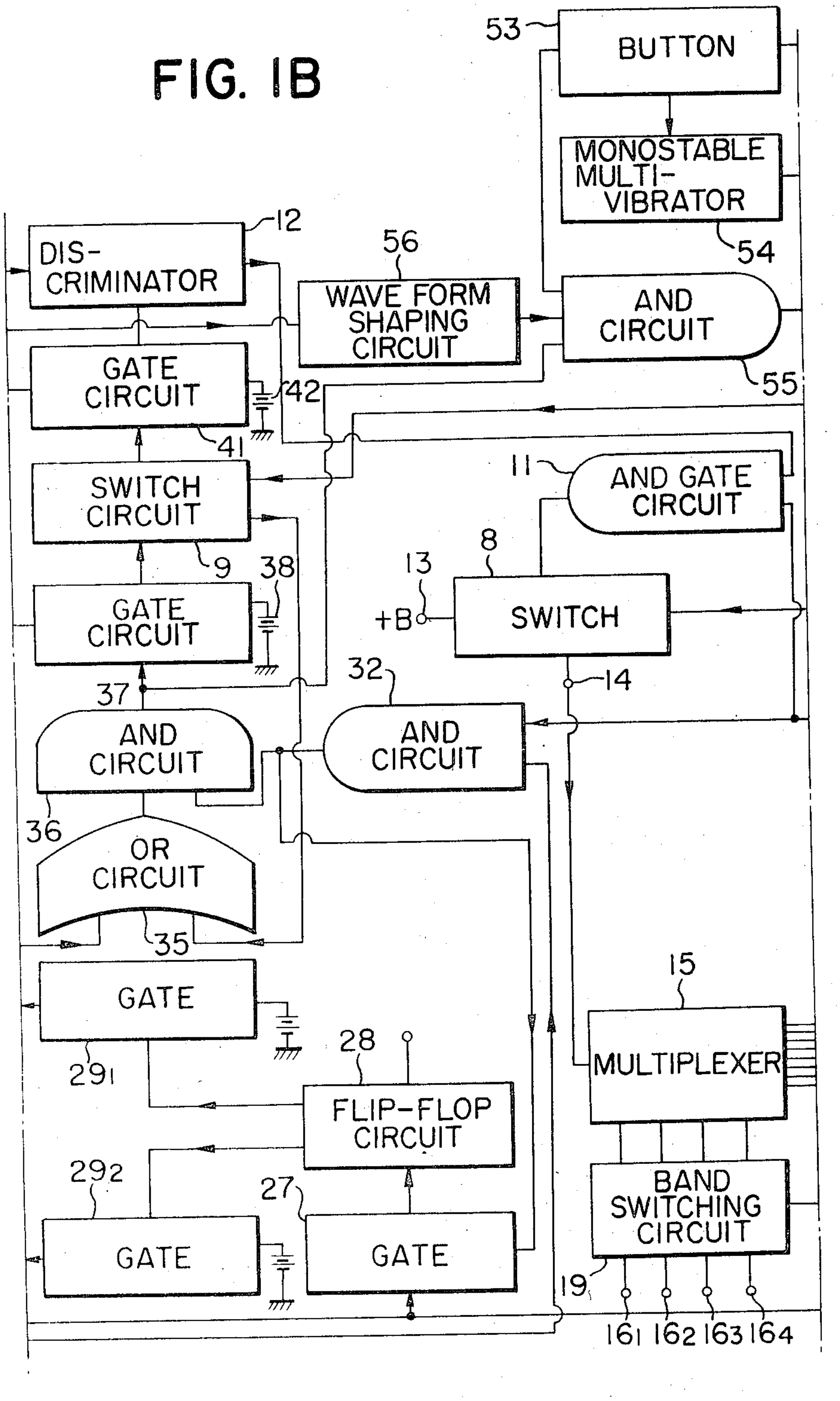
Figure 1C:
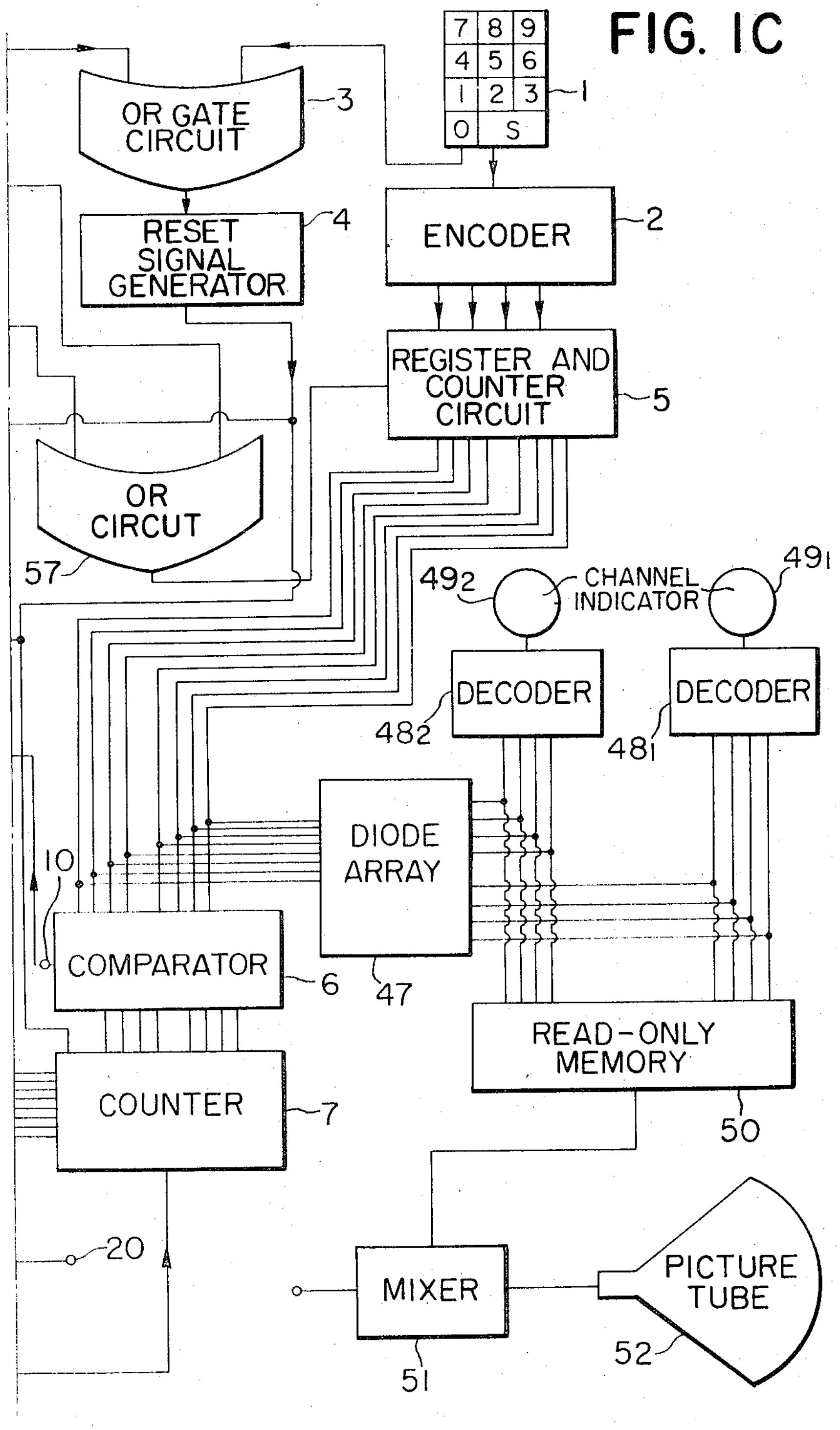
Figures 2A, 2B, 2C, 2D, 2E:
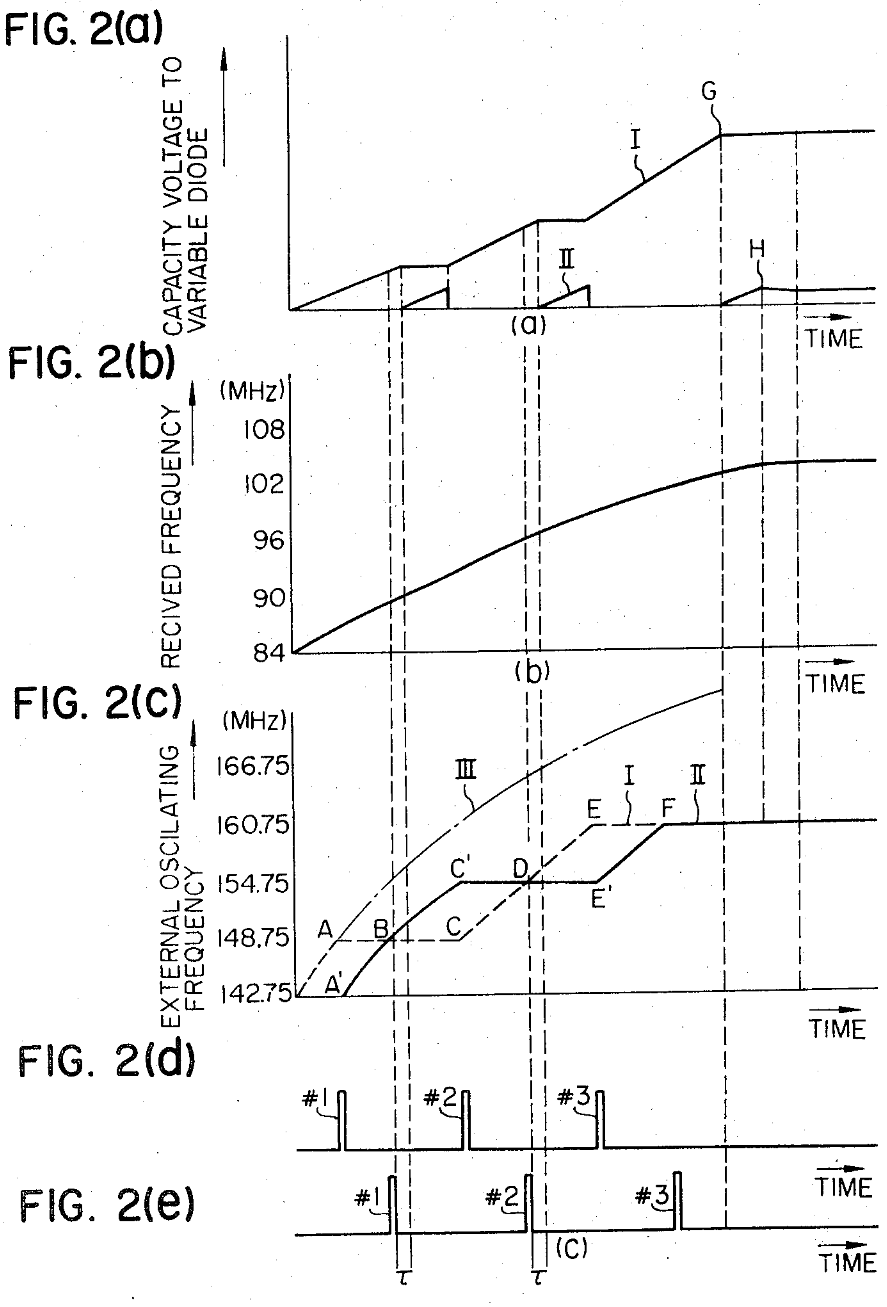
FIGS. 2(*a*)–2(*e*), and FIGS. 3(*a*)–3(*c*) are curves for explanation of the mode of operation thereof.

Referring to FIGS. 1A, 2B and 1C, a desired channel number is fed into a keyboard 1 by, for example, depressing the 0 and 3 buttons for channel No. 3 or depressing the 3 and 4 butons in that order for selection of channel 34, and the selected channel number is encoded into binary codes with each digit comprising four bits. Simultaneously, when the buttons on the keyboard 1 are depressed, the signal is applied through an OR gate 3 to a reset signal generator 4 to generate the reset signals resetting a counter 7, a B power source selection switch 8, and a switching circuit 9 for a voltage sweep sub-circuit, respectively. That is, the counter 7 is reset to zero; the B power source selection switch 8 is reset to disconnect the B power source; and the switching circuit 9 is reset to release a main-sweep-circuit-holding circuit as will be described in more detail hereinafter.

The binary coded signals from the encoder 2 are applied to a register 5 which has also a function of a counter and will be referred to hereinafter as "the register-counter" for brevity and in which the binary coded signals are stored. A signal consisting of two digits each comprising 4 bits from the register-counter 5 is applied to a comparator 6 where the signal from the register-counter 5 and that from the counter 7 are compared with each other to determine whether or not the former stored in the register-counter 5 coincides with the latter in the counter 7 to generate the coincidence or non-coincidence signal. Since the counter 7 has been reset as described above, the non-coincidence signal is derived from a terminal 10 which each of all buttons except the button representing zero on the keyboard 1 has been depressed. This signal is applied to the B power source selection switch 8 through an AND gate 11, which accomplishes the AND function when the coincidence signal is applied from the terminal 10 simultaneously when the signal representative of the reception by a discriminator 12 of an intermediate frequency of 58.75 MHz is also applied thereto. In response to the output from the AND gate 11, the B power source is cut off, but if there is no output from the AND gate 11, the B power source is connected to a multiplexer 15 through terminals 13 and 14, and one of terminals $16_1$–$16_4$ is selected by the multiplexer 15 in response to the binary coded signal from the counter 7 to be connected to the B power source. That is, the terminal $16_1$ is selected for selecting the channel numbers 0 to 3; the terminal $16_2$, for selecting the channel numbers 4 to 7; the terminal $16_3$, for selecting the channel numbers 8 to 12; and the terminal $16_4$, for selecting the channel numbers 13 to 62, respectively. It should be noted that the terminals $16_1$ is connected to terminals $17_1$ and $18_1$; the terminal $16_2$, to the terminals $17_2$ and $18_2$; the terminal $16_3$, to the terminal $17_3$; and the terminal $16_4$, to the terminals $17_3$ and $18_4$, respectively, although their connections are not shown in FIGS. 1A, 1B and 1C. A negative voltage is derived from a terminal 20 when it is desired to derive the negative voltage from a band switching circuit 19 in response to the output of the multiplexer 15.

The channel selection device in accordance with the present invention further comprises VHF band sweep oscillators $21_1$ and $21_2$, UHF band sweep oscillators $22_1$ and $22_2$, the aforementioned terminals $17_1$–$17_3$, terminal $17_4$, and terminals $18_1$–$18_3$. Terminal $17_1$ being for connection with diodes for selection of the high or low band in the VHF band in the VHF band sweep oscillators $21_1$ and $22_2$ while the terminal $17_3$ is for selection of the channels lower than No. 7 and No. 7 or higher than No. 7 also in the VHF band sweep oscillators $21_1$ and $21_2$. Terminal $17_4$ is for connecting the VHF band sweep oscillators $21_1$ and $22_2$ to the +B power source, the aforementioned terminal $18_1$ being for connection of a VHF section in the tuner 23 to the +B power source. Terminal $18_2$ is for selection of the higher or lower band in the tuner 23 and terminal $18_3$ is for connection of a UHF section in the tuner 23 to the +B power source.

Since the counter 7 is reset to zero, that is channel No. 0 is stored in the counter 7, +B voltage is applied to the sweep oscillator $21_1$ and $21_2$ through the band switching circuit 19, so that the local oscillator in the tuner 23 functions as that for the low band. The sweep oscillators oscillate at a frequency equal to the lowest frequency in the band minus 6 MHz plus the intermediate frequency, that is 142.75 MHz = 90 MHz + 6 MHz + 58.75 MHz, the frequency 142.75 MHz being assigned for channel 0. Even though one sweep oscillator starts to sweep, the other sweep oscillator does not start the sweep as will be described in detail with reference to FIG. 2(*c*). That is, the dashed curve I indicates the frequency at which one sweep oscillator, for example, $21_1$ has started to sweep whereas the solid horizontal line II indicates the fixed frequency at which the other oscillator $21_2$ oscillates. When the oscillating frequencies reach the points A and A′ respectively, the difference between them becomes 6 MHz and is detected by a detector 25, which has a double function of detecting and amplifying the best of 6 MHz with a higher degree of accuracy in frequency. The output of the detector 25 is shaped into a pulse by a pulse shaping circuit 26 as shown in FIG. 2(*d*) in which the pulses are spaced apart by a time interval during which time the difference in frequency becomes 6 MHz. These pulses are applied to a flip-flop 28 through a gate 27, which is opened and will be closed as will be described hereinafter. The state of flip-flop 28 is reversed in response to the pulse applied thereto so that a gate $29_1$ is closed while a gate $29_2$ is opened. Therefore, the oscillating frequency of the sweep oscillator $21_1$ is keyed while the oscillating frequency of the sweep oscillator $21_2$ sweeps. In other words, the sweep oscillator which sweeps and the other sweep oscillator whose oscillating frequency is keyed are reversed in function. At the time B in FIG. 2(*c*), the same frequency is applied from both of the sweep oscillators $21_1$ and $21_2$ to a zero beat detecting circuit 30, the zero beats being shaped by a wave shaping circuit 31 into the pulses (stop signals) shown in FIG. 2(*e*) to be applied to an AND circuit 32. However, to the other input terminal of the AND circuit 32 is connected to the comparator 6 and receives the signal representing the non-coincidence of the binary coded signals stored in the register-counter 5 and the counter 7 respectively, so that no output appears on the output terminal of the AND gate 32 even when the stop signal No. 1 is applied thereto.

The signal No. 1 representative of the difference in frequency of 6 MHz is also applied to the counter 7, so that the binary number representative of the channel 0 stored in the counter 7 is added with 1. Therefore, the binary number representative of the channel 1 is now stored in the counter 7. It is assumed that the desired channel is 3 so that the buttons 0 and 3 on the keyboard 1 are depressed. In this case, the binary numbers stored in the register-counter 5 and the counter 7 respectively are different from each other, so that no output appears on the terminal 10 of the comparator 6. As a result no output appears at the output terminal of the AND circuit 32, and the gate circuit 27 remains open. At the time C and C′, the signal No. 2 representative of the difference in frequency of 6 MHz appears, and at the time D, the functions similar to those described above are cycled. In like manner, at the time E and E′, the signal 3 representative of the difference in frequency of 6 MHz again appears and the binary coded signal representative of the channel 3 is stored in the counter 7 in the manner similar to that described above. The contents of the register-counter 5 and the counter 7 are compared in the comparator 6, and the signal representative of the coincidence thereof is caused to appear at the terminal 10. When the stop signal No. 3 appears at the time F, the AND gate 32 causes the output to appear at the output terminal thereof, so that the gate 27 is closed and the output of the flip-flop 28 forces the sweep oscillators $21_1$ and $21_2$ to stop sweeping. Therefore, the sweep oscillators $21_1$ and $21_2$ now oscillate at the same frequency at the time F. It should be noted that the wave shaping circuit 31 comprises a monostable miltivibrator, so that the stop signal may continue after the time $\tau$. The output of the sweep oscillator $21_1$ which oscillates at 160.75 MHz at the time F is applied to a mixer 33.

The voltage is applied to the variable capacity diode in the local oscillator 24 in the tuner 23 as shown in FIG.2($a$). That is, the main sweep voltage I and the sub-sweep voltage II are superposed to be applied to the variable capacity diode. When the oscillating frequency of the local oscillator 24 in the tuner 23 reaches 160.75 MHz, the zero beats are applied from the mixer 33 to a zero-beat detector 34, from which is derived the signal representative of the coincidence of the oscillating frequencies of the sweep oscillators $21_1$ and $21_2$. This signal is applied to an AND circuit 36 through an OR circuit 35. When the signal representative of the coincidence of the contents in the register-counter 5 and the counter 7 and of the oscillating frequencies of the sweep oscillators $21_1$ and $21_2$ are applied simultaneously to the AND circuit 36, the signal appears at the output terminal thereof, and in response to this output signal a gate 37 is closed. As a result the supply of current from a power source 38 to a main voltage sweep circuit 39 is interrupted to stop sweeping thereof at the time G in FIG. 2($a$). It this case a switching circuit 9 is actuated to open a gate circuit 41, so that the current flows from a power source 42 into a voltage sweep sub-circuit 43 whereby it generates the saw tooth wave. The oscillating frequency of the local oscillator 24 in the tuner 23 is increased, and is mixed with the signals from a high frequency amplifier 44 by a mixer 45. Thus the resulting intermediate frequency is increasing. When the intermediate frequency reaches 58.75 MHz, the signal which is amplified by an intermediate frequency amplifier 46 is discriminated by a discriminator 12, the output of which closes the gate circuit 41, so that the supply of current from the power source 42 through the gate circuit 41 to the voltage sweep sub-circuit 43 is interrupted at the time H in FIG. 2($a$). Therefore, the sub-sweep is stopped. In this case, as shown in FIG. 2($b$) the received frequency is 103.25 MHz, that is the channel 3 is selected. When the frequency of the sub sweep voltage is limited to 4 MHz when converted in frequency with a margin of 4.83 MHz = 1.25 MHz + 3.58 MHz, the sub-sweep circuit will not stop its function by the color subcarrier or aural carrier. Furthermore, even when the received signals fluctuate in strength or are interrupted in the area of weak field intensity, the sub-sweep circuit immediately returns to its selected operating point within a very short time, so that it will not shift to the other channel, opposed to the prior automatic tuning circuit of the voltage sweep type.

There is provided a voltage memory circuit 40 which stores the voltage swept by the main voltage sweep circuit, that is the voltage indicated by G in FIG. 2($a$) as far as the selected channel is received. This voltage memory circuit 40 may be so arranged that the voltage charged on a capacitor is maintained on the side of the gate of a field-effect transistor by utilizing its feature of a high gate leakage resistance. The voltage may be derived from the source of the field-effect transistor, or alternatively the voltage which is in analog quantity may be converted into a digital signal which is derived as an analog signal after the D-A conversion. When the voltage is once stored in the voltage register circuit and the sweep is stopped, instead of the signal from the zero-beat detector 34, a signal from the switching circuit 9 is applied to the OR circuit 35 so that the gate circuit 37 may be normally closed when the gate circuit 41 is opened in order to hold the main voltage sweep circuit 39 in non-sweep state even when no zero beats are generated by and applied from the mixer 33 as the frequency of the local oscillator 24 is slightly increased.

The output of the discriminator 12 of 58.75 MHz is also applied to the AND circuit 11 so that when the coincidence signal from the comparator 6 is also simultaneously applied thereto, the output appears and is applied to the switch 8 to interrupt the B+ power source 13 from the sweep circuit comprising the sweep oscillators $21_1$ and $21_2$ which are arranged outside of the tuner 23.

Thus the operation of the channel selection device in accordance with the present invention for selecting the channel 3 has been accomplished. When it is desired to select, for example, the channel 34 in the UHF band, it is sufficient to depress the buttons 3 and 4 on the keyboard 1 so that the desired channel 34 may be automatically selected in the manner similar to that described above. In the following description, the steps of the channel selection operation which have been already described will not be repeated.

Figures 3A, 3B, 3C:
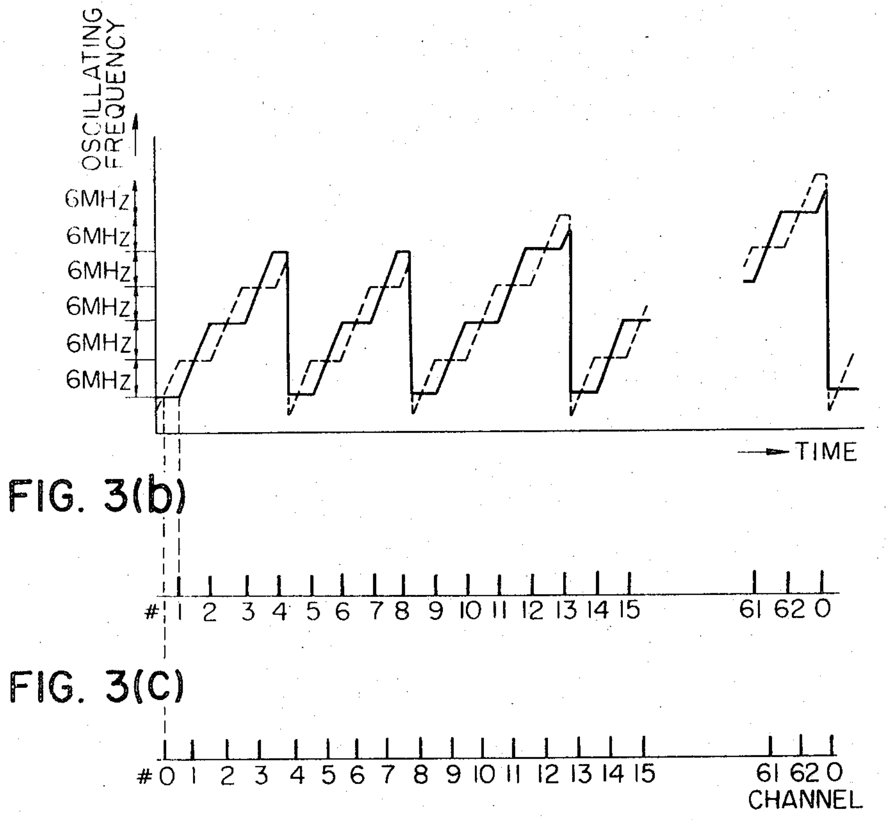

Next the mode of band selection will be described with reference to FIG. 3 illustrating the variation in external oscillating frequency in time. The two sweep oscillators continue oscillation, even after the stop signal for the channel 3 has been generated, to generate the fourth signal representative of the difference in frequency of 6 MHz. Then in the counter 7 is stored a binary coded signal representative of the channel 4, and the outputs are caused to appear on the terminals of the multiplexer 15 and band switching circuit 19 respectively, which terminals correspond to the low part in the high band in the VHF band, that is the channels 4–7. The reason why the VHF band is divided into the lower band including the channels 4–7 is that the channels are assigned with the following frequencies according to the television standards in Japan:

| Channel No. | Assigned Frequencies (MHz) |
|---|---|
| 1 | 90 - 96 |
| 2 | 96 - 102 |
| 3 | 102 - 108 |
| 4 | 170 - 176 |
| 5 | 176 - 182 |
| 6 | 182 - 188 |
| 7 | 188 - 194 |
| 8 | 192 - 198 |
| 9 | 198 - 204 |
| 10 | 204 - 210 |
| 11 | 210 - 216 |
| 12 | 216 - 222 |
| 13 | 470 - 476 |
| 62 | 764 - 770 |
| . | . |
| . | . |

From the above, it is seen that the channels 7 and 8 overlap each other in the frequency width of 2 MHz, so that the detector 25 in FIGS. 1A, 1B and 1C cannot be used for all bands.

The two sweep oscillators $\mathbf{21}_1$ and $\mathbf{21}_2$ and the tuner 23 are so designed as to function for selection of the channels 4–7. The stop signal of the channel 4 appears. The desired channel in both of the VHF and UHF bands can be selected in a manner substantially similar to that described above. It must be previously determined which of the two sweep oscillators must start the sweep while the other is keyed to the band selection. Otherwise, the signal representative of the difference in frequency of 6 MHz will never appear. It is therefore necessary to determine the sequence in which the outputs of the flip-flop 28 are applied to the sweep oscillators $\mathbf{21}_1$, $\mathbf{21}_2$, $\mathbf{22}_1$ and $\mathbf{22}_2$.

The binary number representative of the channel number being received, which is stored in the circuit 5 comprising a register and a counter, is applied to decoder $\mathbf{48}_1$ and $\mathbf{48}_2$ through a diode array or matrix, and is indicated by channel indicators $\mathbf{49}_1$ and $\mathbf{49}_2$ . The indicator $\mathbf{49}_1$ and the decoder $\mathbf{48}_1$ are for displaying the first digit of the channel number while the decoder $\mathbf{48}_2$ and the indicator $\mathbf{49}_2$ are for displaying the second digit. Alternatively, the binary number from the diode array 47 may be added to a read-only memory 50 which is a number generator, to mix it with the video signals in a mixer 51 to display the channel number on a picture tube 52.

To select a desired channel number with the use of a remote control unit, first a remote-control-start button 53 is depressed to actuate a monostable multivibrator 54 and to turn ON the gate of an AND circuit 55. Simultaneously, the signal is applied to the reset signal generator 4 through the OR circuit 3 to reset the counter 7, the switch 8 and the switching circuit 9. Therefore, the channel selection device is prepared to select the desired channel from the channel 0.

The output of the monostable multivibrator 54 is applied to the counter 5 through the OR circuit 57 so that a binary number added with 1 to the binary number in the circuit 5 is stored again in the circuit 5. The comparator 6 compares the content of the circuit 5 with that of the counter 7 to cause the signal representative of the non-coincidence to appear at the terminal 10. The non-coincidence signal is applied through the AND gate circuit 11 to the switch 8 so that the +B power source 13 is connected to the multiplexer 15 through the terminal 14. Since the content of the counter 7 is zero, the switching circuit 19 so functions as to cause the sweep oscillators $\mathbf{21}_1$ and $\mathbf{21}_2$ and the local oscillator 24 in the tuner 23 to function in the lower band in the VHF band. The sweep circuit oscillates at a frequency equal to the frequency which is the lowest frequency in the VHF band minus 6 MHz plus the intermediate frequency. That is, the sweep circuit oscillates at a frequency corresponding to the channel 0, and one of the sweep oscillators starts the sweep whereas the other does not start the sweep as described with reference to FIGS. 2(*a*)–2(*d*) in conjunction with the channel selection by the keyboard. As the signal representative of the difference in frequency of 6 MHz appears, the functions of the two sweep oscillators are reversed, and the counter 7 counts in response to the signal representative of the difference in frequency of 6 MHz in a manner described hereinbefore.

When the binary numbers stored in the circuit 5 and the counter 7 coincides, the coincidence signal appears at the output terminal of the comparator 6. When the two frequencies of the sweep oscillators coincide with each other, the output appears at the output terminal of the AND circuit 32, and in response to this output, the gate circuit 27 is turned OFF and causes the sweep oscillators to stop sweeping through the flip-flop 28. Until the sweep is stopped, the sweep oscillators continue to oscillate, and the outputs are applied to the mixer 33. When the oscillating frequency of the local oscillator 24 in the tuner 23 coincides with that of the sweep oscillators, the mixer 33 generates the zero beats which are applied to the zero-beat detector 34. The output of the detector 34 is applied through the OR circuit 35 to the AND circuit 36. When the signal representative of the coincidence of the contents in the circuit 5 and the counter 7 and the signal representative of the coincidence of the frequencies of the two sweep oscillators are simultaneously applied to the AND gate 36, the output thereof appears at the output terminal, and in response to this output, the gate circuit 37 is turned OFF. Therefore the supply of current from the power source 38 to the main voltage sweep circuit 39 is interrupted, whereby the circuit 39 stops sweeping. Simultaneously the output of the AND circuit 36 is applied to an AND circuit 55, and when the outputs from the remote-control button 53 and a wave shaping circuit 56 are simultaneously applied to the AND circuit 55 together with the output from the AND circuit 36, the output appears at the output terminal of the AND gate 55.

When the main voltage sweep by the main voltage sweep circuit 39 is stopped, the voltage at the time is stored in the voltage memory circuit 40. Simultaneously, when the gate 37 is turned OFF, the switching circuit 9 is actuated to turn ON the gate circuit 41, so that the current from the power source 42 flows into the voltage sweep sub-circuit 43 to generate the sawtooth wave. The oscillating frequency of the local oscillator 24 in the tuner 23 is gradually increased and is mixed with the signals from the high frequency amplifiers 44 by the mixer 45, so that the resulting intermediate frequency becomes higher. When the voltage is stored in the voltage memory circuit 40 and the sweep is stopped, instead of the signal from the zero-beat detector 34, the signal from the switching circuit 9 is applied to the OR gate 35 so that the gate circuit 37 may be normally turned OFF as far as the gate circuit 41 is turned ON in order to hold the sweep circuit 39 under the non-sweep condition.

When there is no output from the discrimination 12, the voltage sweep sub-circuit 43 is returned to its normal condition after the sweep of 4 MHz when converted into frequency. In this case, the flyback pulse may be derived from the sub voltage sweep circuit, and be shaped by a wave shaping circuit 56 to be applied to the AND circuit 55. The output appears at the output terminal of the AND gate 55 when the output from the wave shaping circuit 56 is applied thereto, so that the pulse from the wave shaping circuit 56 passes through the AND circuit 55 and is applied to the counter 55 through the OR circuit 57.

The number stored in the circuit 5 is increased by 1, so that the content of the circuit 5 is higher than that of the counter 7 by 1. The non-coincidence signal appears on the output 10 of the comparator 6 and is applied to the AND circuit 32. Since the channel selection device is now returned to the initial state before it has been energized, the operation described hereinbefore will be cycled. The main voltage sweep circuit 39, the circuit 5 and the counter 7 function to reach the channel being received, and the sub-voltage sweep circuit 43 is further energized, so that the output appears from the discrimination 12 for 58.75 MHz. In this case, the gate circuit 41 is turned OFF, so that the supply of current from the power source 42 to the sub-voltage sweep circuit 43 is interrupted. As a result the voltage sweep is stopped, and the local oscillator 24 continues to oscillate at the normal frequency. Simultaneously, the output of the discrimination 12 is applied through the AND circuit 11 to the switch 8 to disconnect the sweep oscillators $21_1$, $21_2$, $22_1$ and $22_2$ from the power source. When the discrimination 12 is discriminating 58.75 MHz, the flyback pulse is not generated by the sub-voltage sweep circuit 43, so that the channel selection device continues to select the channel being received.

The remote-control operation described above will be accomplished in the same manner when a button mounted on a television receiver is depressed so that the sequential channel selection becomes possible. The term "remote-control button" has been used to refer to a remote-control switch which may be a switch coupled to a wire. Alternatively the switch on the television receiver may be actuated by a wireless method such as the ultrasonic wave.

FIG. 3 illustrates the oscillating frequency of the two sweep oscillators with two curves. In case of band selection, one of the two sweep oscillators starts the sweep as indicated by the dashed lines while the frequency indicated by the solid lines remains at the frequency equal to the frequency which is the frequency at the lower channel boundary of the lowest channel in the band plus the intermediate frequency. For this purpose, the flip-flop 28 is reset whenever the band selection is made, and the gates for the sweep oscillator which sweeps and for the sweep oscillator which is keyed are selected. These gates are connected to the sweep oscillators in such a manner that the results shown in FIG. 3 may be attained, and the counters 5 and 7 of the base 63 are used.

So far the channel selection device in accordance with the present invention has been described in conjunction with the television standards in Japan, but it is seen that the device of the present invention may be also used in conjunction with the FCC system in USA, the CCIR system in Western Europe and any other system used in Eastern Europe, France, England and so on.

With reference to FIG. 1, the sub voltage sweep circuit has been described as being connected with the voltage memory circuit 40. Alternatively, for connection the main sweep voltage may be applied to one end of the variable capacity diode in the turner 23 whereas the sub-sweep voltage to the other end thereof.

The ratio of the variation in received frequency to the voltage applied to the variable capacitance diode used in the tuner 23 varies depending upon the higher and lower bands in the VHF band and the UHF band, so that when it is desired to select the ranges of the sub-sweep frequency at the order of 4 MHz, it is required to select the ranges of the sweep voltages for respective bands.

The power source of the memory 5 may be independent of the power source for the television receiver so that even when the receiver is cut off, the memory 5 may remain in connection with its independent power source. This arrangement is advantageous in that when the receiver is turned ON, the channel which had been selected before the receiver was turned OFF may be received. However, the counter 7, the switch 8 and the sub-voltage sweep circuit switch 9 must be reset when the power source is connected.

In band selection, the multiplexer switches only when the first signal representative of the difference in frequency of 6 MHz of the next band is received by the counter 7. For example, when the lower band in the VHF band is shifted to the higher band as shown in FIG. 3, the band selection is accomplished only after the signal No. 4 appears. This arrangement is advantageous because the channel selection device of the present invention is controlled in response to both the signal representative of the difference in frequency of 6 MHz and the stop signal as described above.

The upper limit of the sweep by the two groups of the sweep oscillators $21_1$, $21_2$, $22_1$ and $22_2$ is determined by applying the trigger signal to the trigger of the SCR in the sweep circuit in response to the band selection signal from the multiplexer 15.

What is claimed is:

1. A channel selection device for use with a television receiver comprising two frequency-sweep oscillator circuits for oscillating at a constant frequency and for also sweeping their respective oscillating frequencies in respective predetermined frequency ranges, detecting means connected to said oscillator circuits for detecting the difference in oscillation frequency between said two frequency-sweep oscillator circuits, means for reversing the functions of said two frequency-sweep oscillator circuits responsive to the detected difference in oscillation frequency between the two frequency-sweep oscillator circuits being a predetermined value such that one of said two oscillator circuits which was producing a constant frequency commences sweeping its frequency over said predetermined frequency range while the other oscillator circuit terminates a sweeping operation and commences to produce a constant frequency output, means for controlling the functioning of said two frequency-sweep oscillator circuits to alternately repeat the function reversal at each detected predetermined frequency value, counting means for counting the number of function reversals of said two frequency-sweep oscillator circuits, register means for registering a desired receiving channel number, means connected to said counting means and register means for generating a coincidence signal corresponding to a coincidence between signals in said register means and said counting means, means for stopping the one of said two frequency-sweep oscillator circuits operating in a sweeping state when the coincidence signal is detected, a tuner for said television receiver, and means for connecting said one oscillating circuit operating in a sweeping function which is stopped by said coincidence signal to operate as the local oscillator of said tuner.

2. A channel selection device as set forth in claim 1, wherein said detector means comprises means to respond to a frequency difference between said first and second sweep circuits equal to twice said channel frequency interval.

3. A channel selection device as set forth in claim 1 comprising a stop signal means for generating a stop signal connected to said two oscillator circuits, a counter circuit, means for incrementing said counter circuit each time the difference in frequency sensed between the two oscillator circuits in said detector means is equal to said predetermined frequency value, and a comparator circuit connected to said counter circuit and to a manually controlled channel selector, said comparator circuit comparing the output of said counter circuit with a signal generated by the channel being manually selected.

4. A channel selection device as set forth in claim 3, wherein said tuner comprises a local oscillator providing a frequency sweep, means connected to said two oscillation circuits for detecting when the frequency of said local oscillator is equal to the frequencies of said two oscillator circuits for terminating the operation of said local oscillator.

5. A channel selection device as set forth in claim 3, comprising means for detecting completion of the channel selection operation occurring when the difference in frequencies between said two oscillation circuits is equal to said channel frequency interval, said tuner comprising a variable reactance element, a voltage sweep circuit having its output applied across said variable reactance element, said sweep produced by said voltage sweep circuit being terminated when the oscillating frequency of said local oscillator in said tuner coincides with the frequency of said two oscillator circuits at which frequencies said two oscillator circuits terminate their sweeping function for accomplishing said channel selection, and means operatively connected with said means for detecting the completion of the channel selection operation for disconnecting said first and second sweep oscillator circuits from a power source in response to completion of the operation of said channel selection.

6. A channel selection device as set forth in claim 3 comprising multiplexer circuit connected to receive the output of said counter circuit, said multiplexer circuit decoding the output of said counter circuit and providing a band selection voltage, the output of said multiplexer being applied to said two oscillator circuits for accomplishing the channel selection.

7. A channel selection device as set forth in claim 3, comprising a memory circuit connected to said manually operated channel selector for storing a signal representative of a channel being selected, and display means connected to said memory circuit for displaying the channel selected.

8. A channel selection device as set forth in claim 1, said device having a carrier frequency corresponding to a selected channel and further comprising a main voltage sweep circuit, a sub-voltage sweep circuit, said tuner comprising a variable capacitance diode serving as a tuning element, means for providing sweep voltages of said main and subvoltage sweep circuits to said variable capacitance diode for sweeping at a frequency lower than said carrier frequency corresponding to said selected channel, means for storing the voltage of said main voltage sweep circuit and simultaneously performing the voltage sweep by said sub-voltage sweep circuit, means for detecting the presence of said carrier, and means for stopping the voltage sweep of said sub-voltage sweep circuit by said detecting means for presence of said carrier.

9. A channel selection device as set forth in claim 8 wherein said sweep voltage for said voltage sweep sub-circuit is capable of being varied for each band for almost equalizing the sweep frequency ranges of said voltage sweep main circuit and said voltage sweep sub-circuit for all of the channels selected.

10. A channel selection device as set forth in claim 8 wherein said variable capacitance diode is provided with first and second terminals, the sweep voltage of the main voltage sweep circuit being applied to one of said first and second terminals while the sweep voltage of said sub-voltage sweep circuit is applied to the other terminal of said first or second terminals.

11. A channel selection device as set forth in claim 8 wherein said tuner comprises a local oscillator, a reference frequency generator circuit for generating a reference frequency, corresponding to a channel selected by an operator, said detecting means being connected to said local oscillator and to said reference frequency generator for detecting the zero beat of said reference frequency and of the oscillating frequency of said local oscillator and for terminating the sweep of said main voltage sweep circuit when said zero beats are detected, said sweep of said main voltage sweep circuit being stored after being terminated, the sweep of said voltage sweep sub-circuit being commenced while the voltage at which said main voltage sweep circuit terminated is being stored.

12. A channel selection device as set forth in claim 1, comprising means for starting one of said two oscillator circuits to start from a reference frequency and the other oscillator circuit to start to sweep from a frequency lower than said reference frequency.

13. A channel selection device as set forth in claim 1 comprising zero beat detector means connected to said two frequency-sweep oscillator circuits for sensing zero beats in the output of said two frequency-sweep oscillator circuits, and an AND gate connected to receive the output of said zero beat detector means at said coincidence signal, said AND gate producing an output to stop the one oscillator circuit of said two frequency-sweep oscillator circuits from sweeping to producing a constant frequency oscillation, both of said two frequency-sweep oscillator circuits producing an oscillating signal at the same frequency.

* * * * *

UNITED STATES PATENT OFFICE
CERTIFICATE OF CORRECTION

Patent No. 3,846,707 Dated November 5, 1974

Inventor(s) YOICHI SAKAMOTO

It is certified that error appears in the above-identified patent and that said Letters Patent are hereby corrected as shown below:

Column 3, line 16, change "which" to -- when --;

Column 3, line 51, change "being" to -- is --.

Column 4, line 17, change "best" to -- beat --.

Column 9, line 18, change "discrimination" to -- discriminator --;

line 59, change "turner" to -- tuner --.

Column 11, lines 47 and 48, change "first and second sweep" to -- two --.

Signed and sealed this 11th day of February 1975.

(SEAL)
Attest:

RUTH C. MASON
Attesting Officer

C. MARSHALL DANN
Commissioner of Patents
and Trademarks